US010857934B2

(12) United States Patent
Tsuchiya et al.

(10) Patent No.: US 10,857,934 B2
(45) Date of Patent: Dec. 8, 2020

(54) VEHICLE LIGHTING SYSTEM

(71) Applicant: HONDA MOTOR CO., LTD., Tokyo (JP)

(72) Inventors: Yuji Tsuchiya, Wako (JP); Ikuo Koyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/621,417

(22) PCT Filed: Jun. 15, 2017

(86) PCT No.: PCT/JP2017/022152
§ 371 (c)(1),
(2) Date: Dec. 11, 2019

(87) PCT Pub. No.: WO2018/229942
PCT Pub. Date: Dec. 20, 2018

(65) Prior Publication Data
US 2020/0101891 A1    Apr. 2, 2020

(51) Int. Cl.
*B60Q 1/30*     (2006.01)
*H05B 45/10*    (2020.01)
*F21S 43/14*    (2018.01)
*F21W 103/30*   (2018.01)
*F21W 103/20*   (2018.01)

(52) U.S. Cl.
CPC ............. *B60Q 1/30* (2013.01); *F21S 43/14* (2018.01); *H05B 45/10* (2020.01); *F21W 2103/20* (2018.01); *F21W 2103/30* (2018.01)

(58) Field of Classification Search
None
See application file for complete search history.

(56) References Cited

U.S. PATENT DOCUMENTS 9,863,621 B2*   1/2018  Dai .................. F21V 23/04
2009/0003006 A1*  1/2009  Tsai ................. B60Q 1/46
                                              362/464
2018/0054862 A1*  2/2018  Takagimoto ......... H05B 45/46

FOREIGN PATENT DOCUMENTS

JP      2015-145224 A    8/2015
JP      2016-175582 A    10/2016
WO      2016152272 A1    9/2016

OTHER PUBLICATIONS

International Search Report by ISA/JP dated Aug. 29, 2017, on PCT/JP2017/022152, 1 page.
Written Opinion by ISA/JP dated Aug. 29, 2017, on PCT/JP2017/022152, 3 pages.

* cited by examiner

*Primary Examiner* — John F Mortell
(74) *Attorney, Agent, or Firm* — Rankin, Hill & Clark LLP (57) ABSTRACT

First lighting bodies are provided to the outer surface of a vehicle body, and second lighting bodies are provided to the outer surface of a trunk lid, which can open/close a trunk. While the trunk lid is closed, a first mode is executed in which the second lighting bodies are lit and the lighting is maintained, and then the first lighting bodies are lit and the lighting is maintained for a prescribed period. When the trunk lid is open, a second mode is executed in which at least the former among the first lighting bodies and the second lighting bodies is lit and the lighting time thereof is set longer than the lighting time of the first lighting bodies in the first mode.

16 Claims, 10 Drawing Sheets

VEHICLE LIGHTING SYSTEM

TECHNICAL FIELD

The present invention relates to a vehicle lighting system.

BACKGROUND ART

Patent Literature 1 discloses a trunk lid-side turn light and a vehicle body-side turn light. The trunk lid-side turn light and the vehicle body-side turn light are aligned horizontally in a straight line while the trunk lid is closed. Patent Literature 1 further discloses that multiple light sources provided in the trunk lid- and vehicle body-side turn lights turn on sequentially from the trunk lid-side turn light to the vehicle body-side turn light continuously in the time axis.

CITATION LIST

Patent Literature

Patent Literature 1: Japanese Patent Application Publication No. 2016-175582

SUMMARY OF INVENTION

Technical Problem

The technique disclosed in Patent Literature 1, however, does not change the control of the turning on of the turn lights even when the trunk lid is opened. This causes inconvenience because the opened trunk lid makes the turn lights on the trunk-lid side invisible from behind the vehicle. Specifically, the turn lights are controlled such that the multiple light sources in each turn light are sequentially turned on continuously in the time axis, and accordingly if only the turn lights on the vehicle-body side can be seen to be turned on, the lighting times of the respective turn lights look as if they were shorter. This causes the inconvenience that discomfort is given to the outside person who sees the turn lights from behind the vehicle.

With the above-situation taken into consideration, an object of the present invention is to provide a lighting system for a vehicle provided with lighting bodies, each extending from an opening-closing body of the vehicle to a vehicle body and each configured to sequentially turn on multiple light sources continuously, the vehicle lighting system designed to give no discomfort to an outside person by making a lighting time of the lighting bodies not seem shorter even when the opening-closing body is opened.

Solution to Problem

The present invention is a vehicle lighting system characterized in that vehicle lighting system includes: a first lighting body provided on an outer surface of a vehicle body; a second lighting body provided on an outer surface of an opening-closing body which is capable of opening and closing an opening provided to the vehicle body; and a lighting controller, in which in a case where a condition for turning on the first lighting body and the second lighting body is satisfied, when the opening-closing body has been closed, the lighting controller performs a first mode of turning on the second lighting body and thereafter turning on the first lighting body, and when the opening-closing body has been opened, the lighting controller performs a second mode of turning on the first lighting body and keeping the first lighting body turned on for a lighting time longer than a lighting time of the first lighting body in the first mode.

Advantageous Effects of Invention

The present invention can provide the lighting system for a vehicle provided with lighting bodies, each extending from an opening-closing body of the vehicle to a vehicle body and each configured to continuously turn on multiple light sources sequentially, the vehicle lighting system designed to give no discomfort to an outside person by making a lighting time of the lighting bodies not seem shorter even when the opening-closing body is opened.

DESCRIPTION OF EMBODIMENTS

Hereinafter, an embodiment of the present invention will be described with reference to the accompanying drawings. Incidentally, FIG. 1 and the other drawings show the up, down, left and right directions from a vehicle with the corresponding arrows, and the following descriptions are based on the directions indicated with the arrows.

Figure 1:
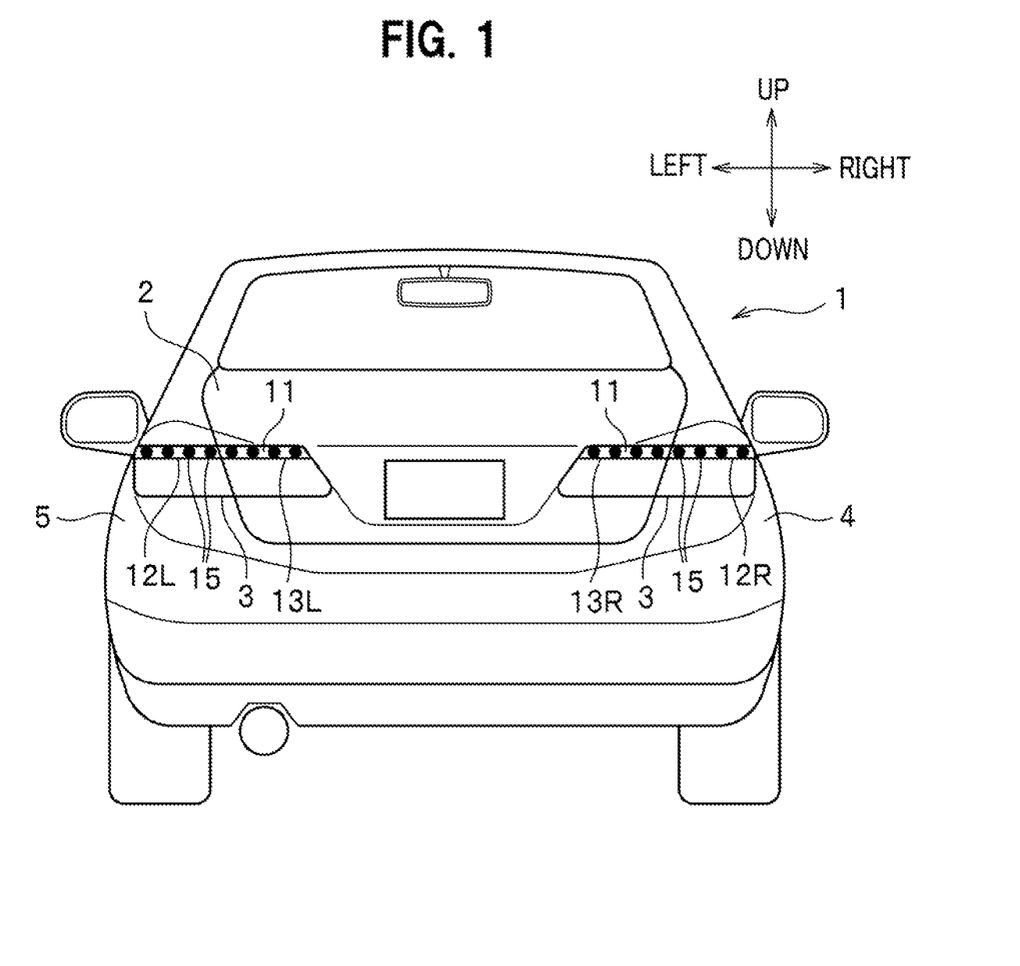
FIG. 1 is a rear view of a vehicle according to an embodiment of the present invention.

FIG. 1 is a rear view of a vehicle 1. A rear portion of the vehicle 1 is provided with a trunk lid 2 serving as an opening-closing body which opens and closes an opening of a trunk. Two sides of the rear portion of the vehicle 1 are provided with tail lamps 3, respectively. Each tail lamp 3 also works as a brake lamp. The tail lamps 3 are provided in the rear portion of the vehicle 1, respectively extending from outer surfaces of vehicle body right part 4 and vehicle body left part 5 to an outer surface of the trunk lid 2 in a way visible from behind the vehicle.

Sequential lamps 11 are provided immediately on top of the tail lamps 3, respectively. Each sequential lamp 11 also works as a turn light and a hazard lamp. The sequential lamps 11 are provided extending along upper portions of the tail lamps 3, respectively. Furthermore, like the tail lamps 3, the sequential lamps 11 are provided in the vehicle rear portion, respectively extending from the outer surfaces of the vehicle body right part 4 and the vehicle body left part 5 to the outer surface of the trunk lid 2 in a way visible from behind the vehicle.

Portions of the sequential lamps 11, which are provided on the outer surfaces of the vehicle body right part 4 and the vehicle body left part 5, are referred to as a first lighting body 12R and a first lighting body 12L, respectively. Meanwhile, portions of the sequential lamps 11, which are provided on the left and right outer surfaces of the trunk lid 2, are referred to as a second lighting body 13R and a second lighting body 13L, respectively. Each sequential lamp 11 is made of multiple light sources 15 such as light-emitting diodes (LEDs), which are arranged in the left-right direction. In this embodiment, the first lighting bodies 12R, 12L each include four light sources 15 arranged in the left-right direction, while the second lighting bodies 13R, 13L each include four light sources 15 arranged in the left-right direction. The number of light sources 15 included in one of the first and second lighting bodies 12R, 12L, 13R, 13L may be set different from the number of light sources 15 included in any other thereof. Incidentally, in FIG. 1 and the other drawings, the light sources 15 are indicated with a black circle when they are turned off, and with a white circle when they are turned on.

Figure 2:
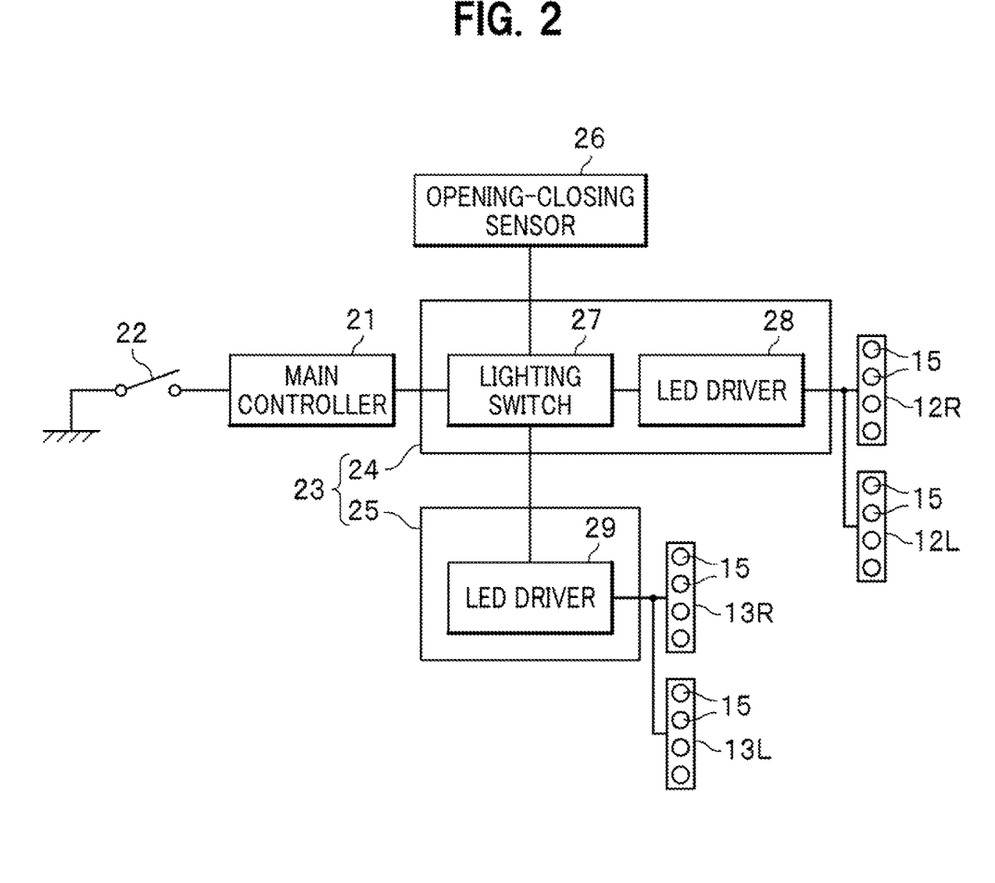
FIG. 2 is a block diagram illustrating electrical connections in a control system which controls the turning on and off of sequential lamps in a vehicle lighting system according to the embodiment of the present invention.

FIG. 2 is a block diagram illustrating electrical connections in a control system which controls the turning on and off of the sequential lamps 11. A main controller 21 is a control device which controls the entirety of the vehicle 1. A hazard lamp switch 22 is provided inside a vehicle compartment, and is a switch which turns on the sequential lamps 11 as the hazard lamps when switched ON. A lighting controller 23 is connected to the main controller 21. The lighting controller 23 is a control device which controls the turning on of the sequential lamps 11. The lighting controller 23 includes: a first controller 24 which controls the turning on of the first lighting bodies 12R, 12L; and a second controller 25 which controls the turning on of the second lighting bodies 13R, 13L. An opening-closing sensor 26 is a sensor which detects whether the trunk lid 2 is opened or closed. The first controller 24 includes a lighting switch 27 and an LED driver 28. Based on a result of the detection by the opening-closing sensor 26, the lighting switch 27 determines which of a first mode and a second mode (although each mode will be described later) should be set in the first lighting bodies 12R, 12L and the second lighting bodies 13R, 13L. Based on the determination, the LED driver 28 sets the first or second mode in the first lighting bodies 12R, 12L to turn on the light sources 15. The second controller 25 includes an LED driver 29. Depending on how the first controller 24 sets the lighting switch 27, the LED driver 29 sets the first or second mode in the second lighting bodies 13R, 13L to turn on the light sources 15.

Figure 3:
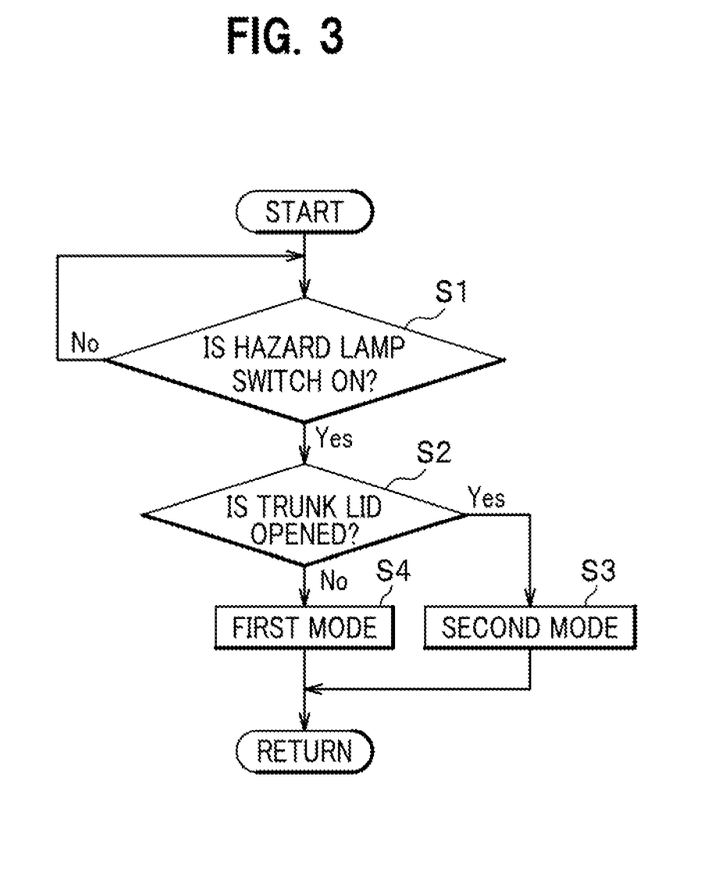
FIG. 3 is a flowchart for explaining how the control system in FIG. 2 controls the turning on and off of the sequential lamps.

FIG. 3 is a flowchart for explaining how the lighting switch 27 in the control system in FIG. 2 controls the turning on and off of the sequential lamps 11. To begin with, based on a signal from the main controller 21, the lighting switch 27 determines whether the hazard lamp switch 22 is ON (S1). That the hazard lamp switch 22 is ON means that a condition for lighting the first lighting body 12R, 12L and the second lighting body 13R, 13L is satisfied. In the case where the condition is satisfied, the opening-closing sensor 26 determines whether the trunk lid 2 is opened (S2). If the trunk lid 2 is closed (if No in step S2), the first mode is set to turn on the first lighting bodies 12R, 12L and the second lighting bodies 13R, 13L. On the other hand, if the trunk lid 2 is opened (if Yes in step S2), the second mode is set to turn on the first lighting bodies 12R, 12L and the second lighting bodies 13R, 13L.

Figure 4:
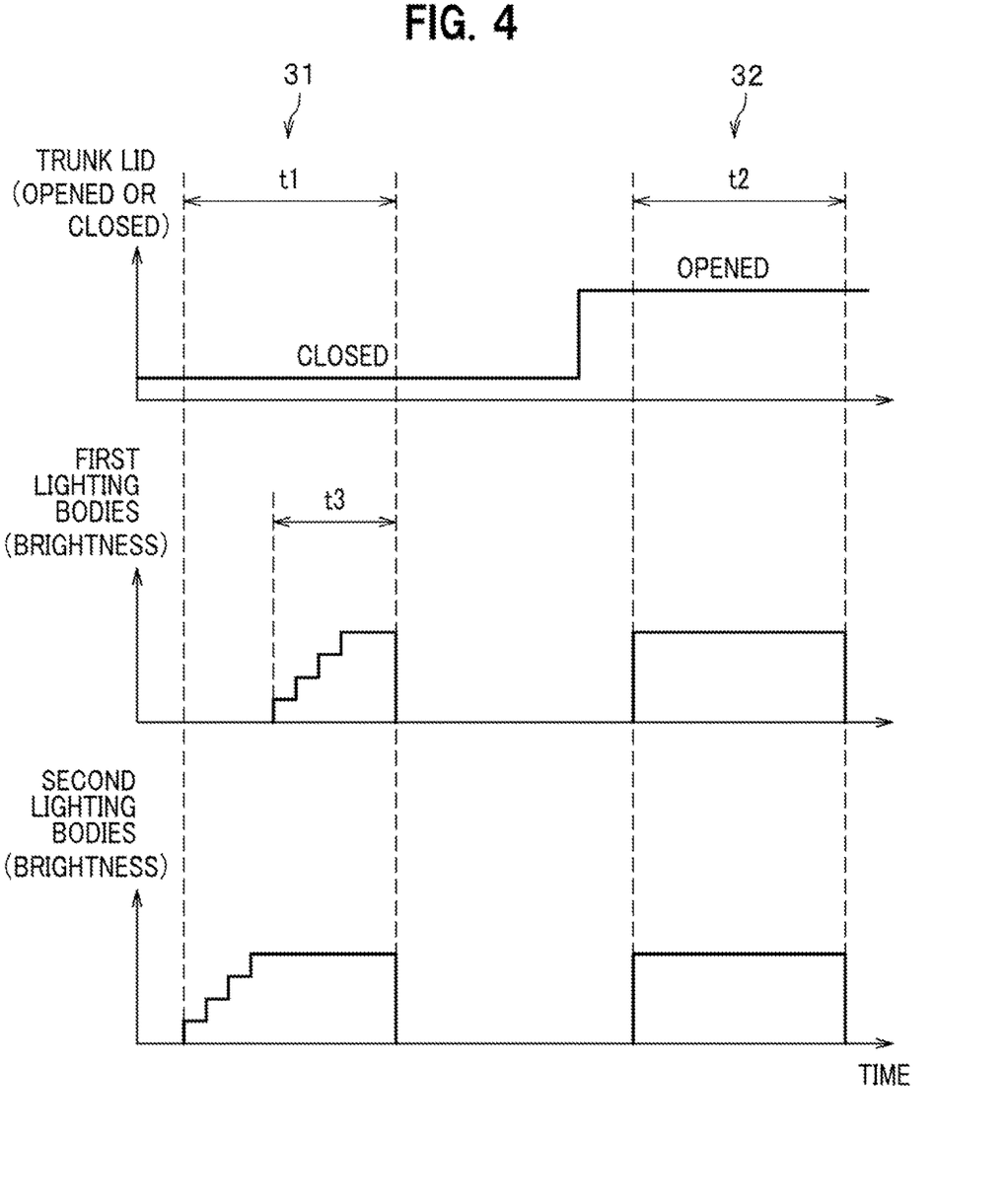
FIG. 4 is a timing chart for explaining a first mode and a second mode in the vehicle lighting system according to the embodiment of the present invention.

Next, detailed descriptions will be provided for the first mode and the second mode. FIG. 4 is a timing chart for explaining the first mode and the second mode. In FIG. 4, the vertical axis shows whether the trunk lid 2 is opened or closed, how bright the first lighting bodies 12R, 12L are, and how bright the second lighting bodies 13R, 13L are, while the horizontal axis represents time change. In FIG. 4, reference sign 31 denotes the first mode, while reference sign 32 denoted the second mode.

In the first mode, the trunk lid 2 is closed. Thus, the second lighting bodies 13R, 13L are turned on and are kept turned on, and thereafter the first lighting bodies 12R, 12L are turned on and are kept turned on for a predetermined time. Specifically, the turning on of each of the second lighting bodies 13R, 13L is performed by sequentially turning on the multiple (four in the case) light sources 15 and keeping the light sources 15 turned on. Thereby, the brightness of each of the second lighting bodies 13R, 13L becomes stronger each time one light source 15 therein is turned on. After having been turned on, the four light sources 15 are kept turned on for a while.

After all the four light sources 15 of each of the second lighting bodies 13R, 13L have been turned on, the light sources 15 of each of the first lighting bodies 12R, 12L are sequentially turned on, and are kept turned on. The brightness of each of the first lighting bodies 12R, 12L becomes stronger each time one light source 15 therein is turned on. After having been turned on, the four light sources 15 are kept turned on for a while. As described above, the eight light sources 15 in total are turned on. After kept turned on for a certain time, the eight light sources 15 are turned off at a time. After a certain time has elapses since the turning off of the light sources 15 at a time, the operation of turning on the second lighting bodies 13R, 13L and then the first lighting bodies 12R, 12L and thereafter turning off all the lighting bodies at a time in the same way as discussed above is repeated. Incidentally, the light sources 15 in the second lighting body 13R and the first lighting body 12R in the vehicle body right part 4 are sequentially turned on from the trunk lid 2 to the vehicle body right part 4, while the light sources 15 in the second lighting body 13L and the first lighting body 12L in the vehicle body left part 5 are sequentially turned on from the trunk lid 2 to the vehicle body left part 5. Furthermore, in this embodiment, a time length t1 from the start of turning on the second lighting bodies 13R, 13L to the turning off of the first lighting bodies 12R, 12L and the second lighting bodies 13R, 13L is set equal to a time length from the turning off of the first lighting bodies 12R, 12L and the second lighting bodies 13R, 13L to the start of turning on the second lighting bodies 13R, 13L.

Meanwhile, in the second mode, the trunk lid 2 is opened. In the second mode, the light sources 15 in the first lighting bodies 12R, 12L and the second lighting bodies 13R, 13L are turned on at a time. Thereafter, the light sources 15 are kept turned on for a while, and are turned off at a time. After that, the light sources 15 are kept turned off for a while, and are turned on at a time again. Subsequently, the above operation is repeated.

A lighting time length t2 in the second mode is longer than a lighting time length t3 for which the first lighting bodies 12R, 12L are kept turned on in the first mode. In addition, the lighting time length t2 for which the first lighting bodies 12R, 12L are kept turned on in the second mode is as long as the time length t1 for which at least one light source 15 is turned on in the first mode (that is to say, a total lighting time length for which the first lighting bodies 12R, 12L and the second lighting bodies 13R, 13L are kept turned on in the first mode).

Figure 5:
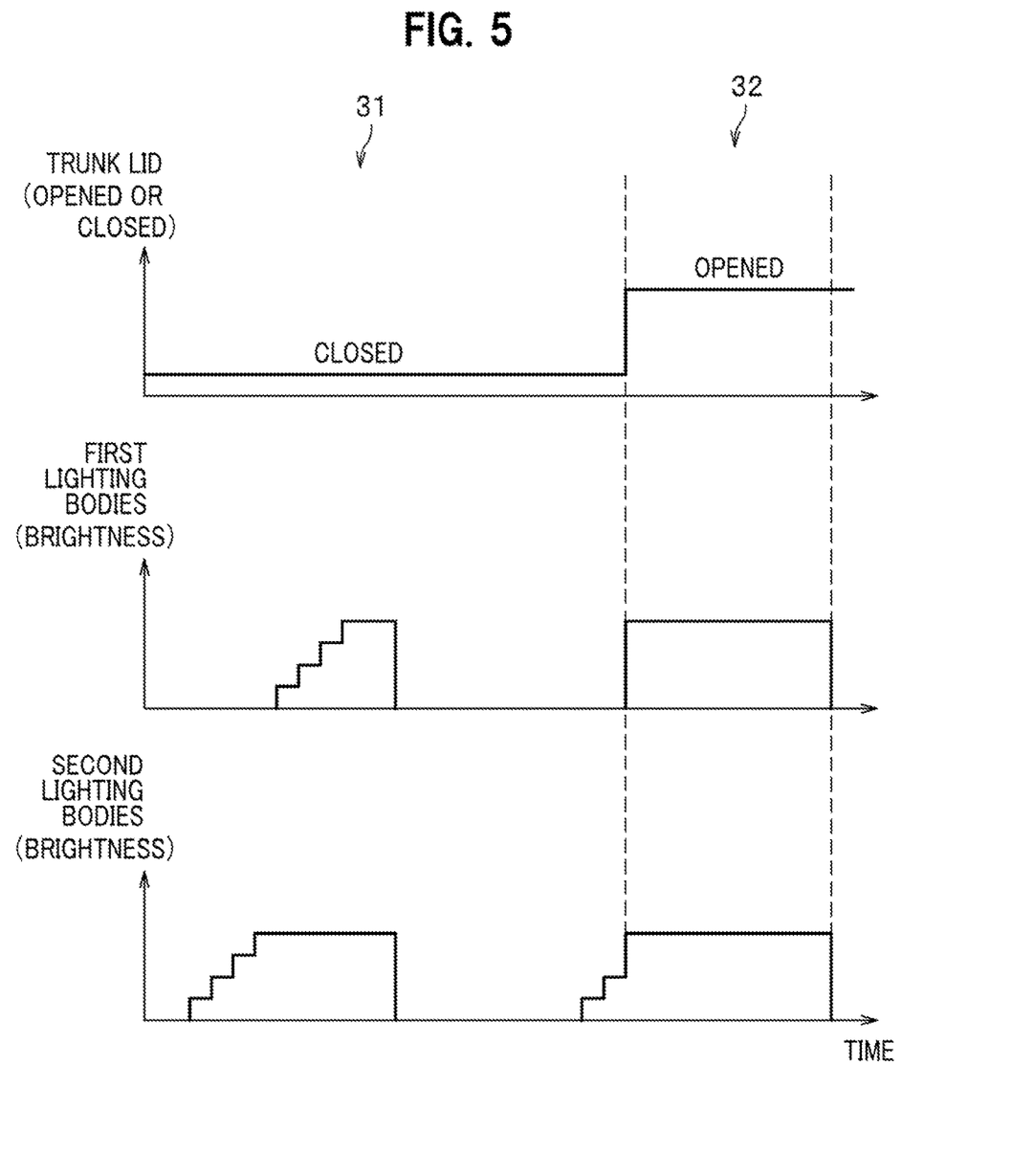
FIG. 5 is another timing chart for explaining the first mode and the second mode in the vehicle lighting system according to the embodiment of the present invention.

FIG. 5 is another timing chart for explaining the first mode and the second mode. As illustrated in FIG. 5, when the opening-closing sensor 26 detects that the trunk lid 2 becomes opened while the first lighting bodies 12R, 12L or the second lighting bodies 13R, 13L are in the middle of being turned on in the first mode, the first mode is shifted to the second mode at the time of the detection. FIG. 5 illustrates an example where the first mode is shifted to the second mode while the second lighting bodies 13R, 13L are in the middle of being turned on.

Figure 6A:
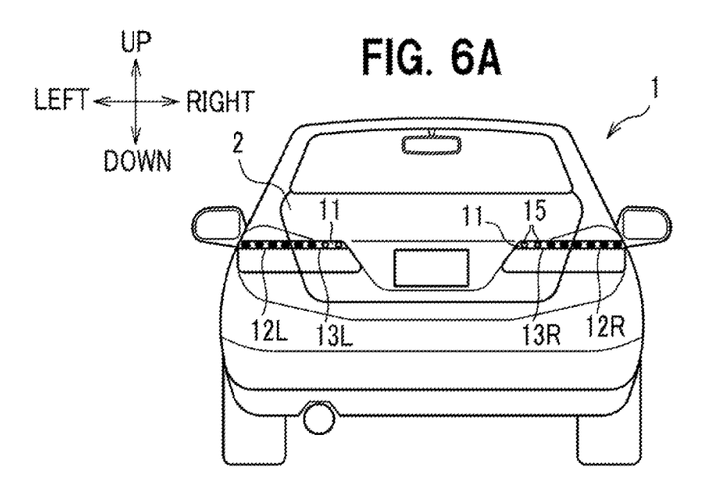
FIGS. 6A to 6D are rear views of the vehicle which show, in order of FIGS. 6A to 6D, how the vehicle lighting system according to the embodiment of the present invention turns on and off the sequential lamps over time in the first mode.
Figure 6B:
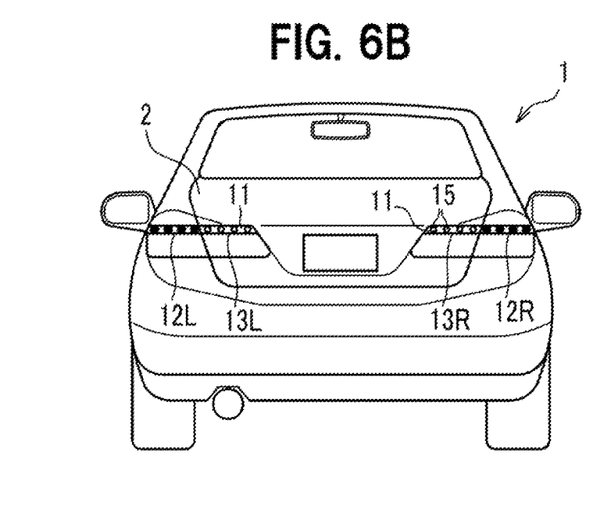
Figure 6C:
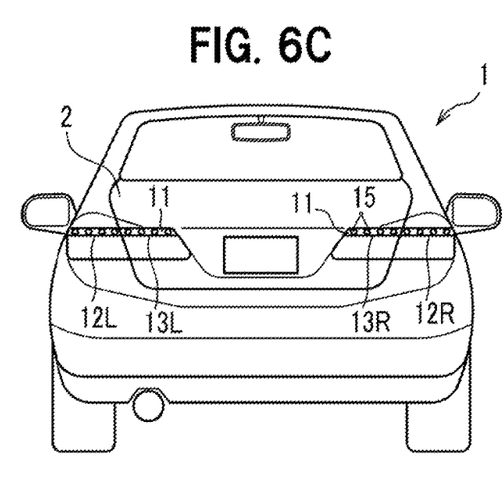
Figure 6D:
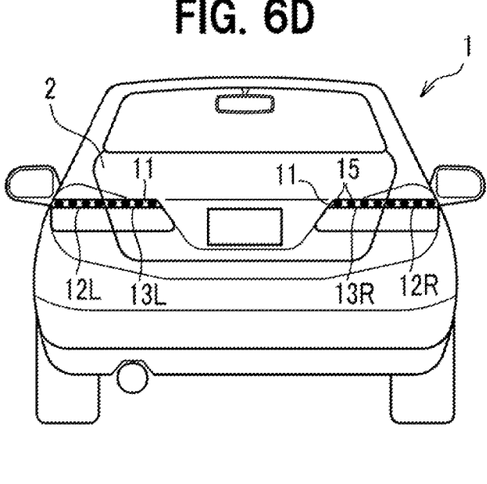

FIGS. 6A to 6D are rear views of the vehicle 1 which show, in order of FIGS. 6A to 6D, how the sequential lamps 11 are turned on and off over time in the first mode. FIG. 6A illustrates a state in which two light sources 15 in each of the second lighting bodies 13R, 13L are turned on FIG. 6B illustrates a subsequent state in which all the light sources 15 in each of the second lighting bodies 13R, 13L are turned on. FIG. 6C illustrates a subsequent state in which all the light sources 15 in each of the first lighting bodies 12R, 12L are turned on. Thus, all the light sources 15 in each of the sequential lamps 11 are turned on. FIG. 6D illustrates a subsequent state in which all the light sources 15 in each of the sequential lamps 11 are turned off.

Figure 7A:
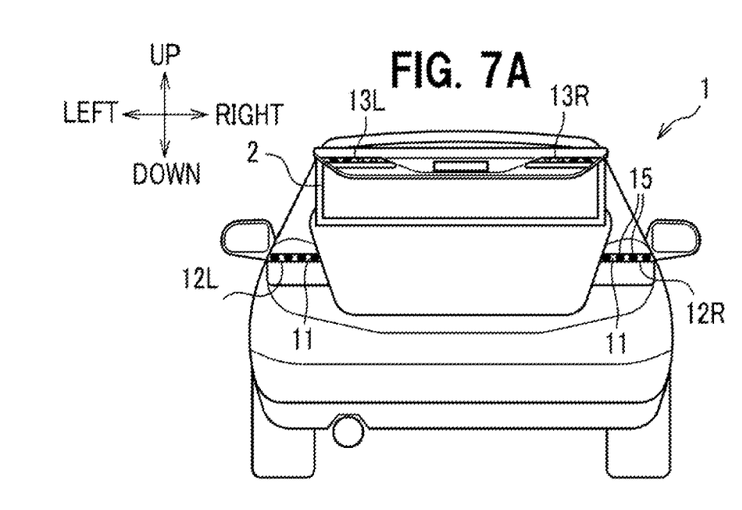
FIGS. 7A to 7D are rear views of the vehicle in a comparative example which show, in order of FIGS. 7A to 7D, how the sequential lamps are turned on and off over time as if in the first mode although the trunk lid is opened.
Figure 7B:
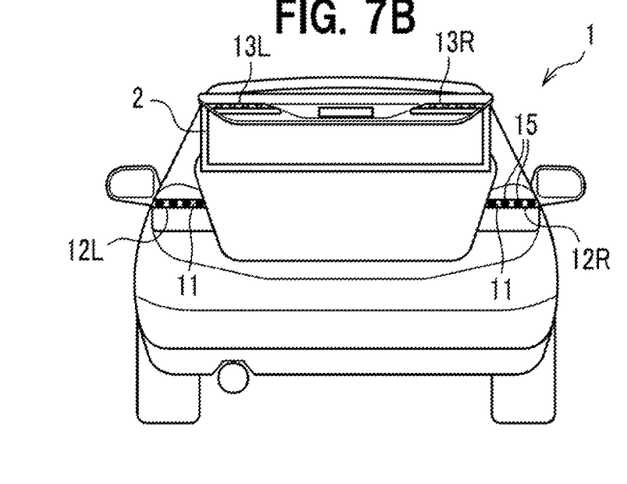
Figure 7C:
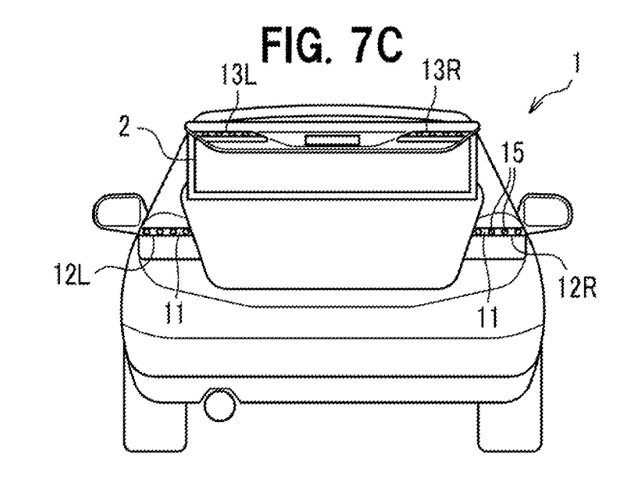
Figure 7D:
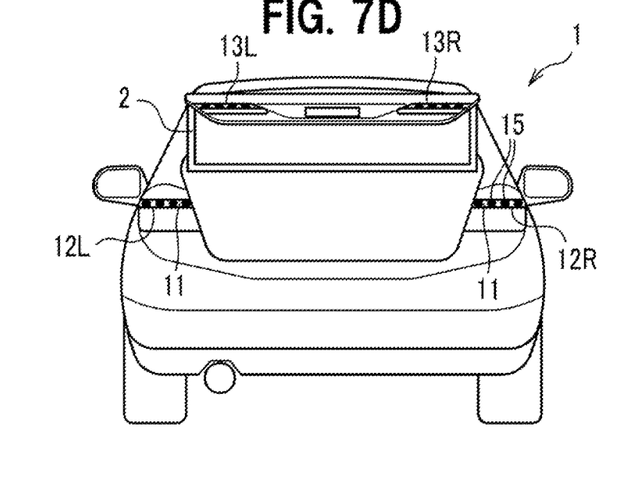

FIGS. 7A to 7D are rear views of the vehicle 1 in a comparative example which show, in order of FIGS. 7A to 7D, how the sequential lamps 11 are turned on and off over time as if in the first mode although the trunk lid 2 is opened. In FIGS. 7A to 7C, although the second lighting bodies 13R, 13L are turned on, the light of the second lighting bodies 13R, 13L is hard to see since the trunk lid 2 is opened. Once the trunk lid 2 is opened at a larger open angle than in the cases illustrated in FIGS. 7A to 7D, the second lighting bodies 13R, 13L are completely invisible. Furthermore, it is learned from the cases illustrated in FIGS. 7A and 7B that the first lighting bodies 12R, 12L are turned off and the wholes of the sequential lamps 11 are hard to see.

Figure 8A:
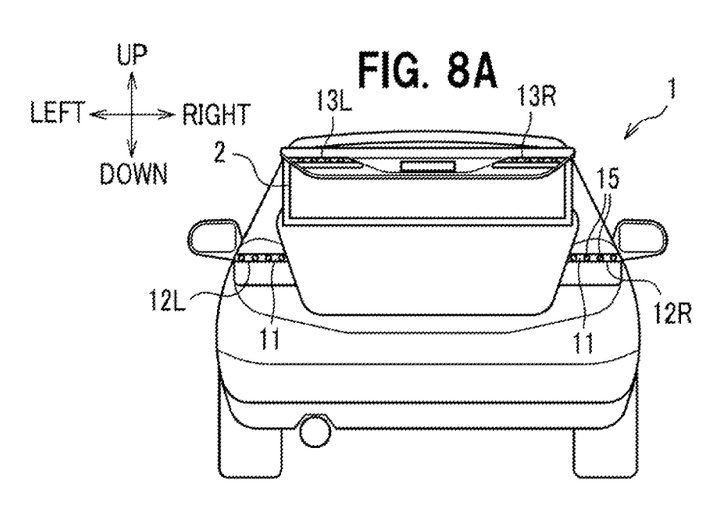
FIGS. 8A to 8D are rear views of the vehicle which show, in order of FIGS. 8A to 8D, how the vehicle lighting system according to the embodiment of the present invention turns on and off the sequential lamps over time in the second mode.
Figure 8B:
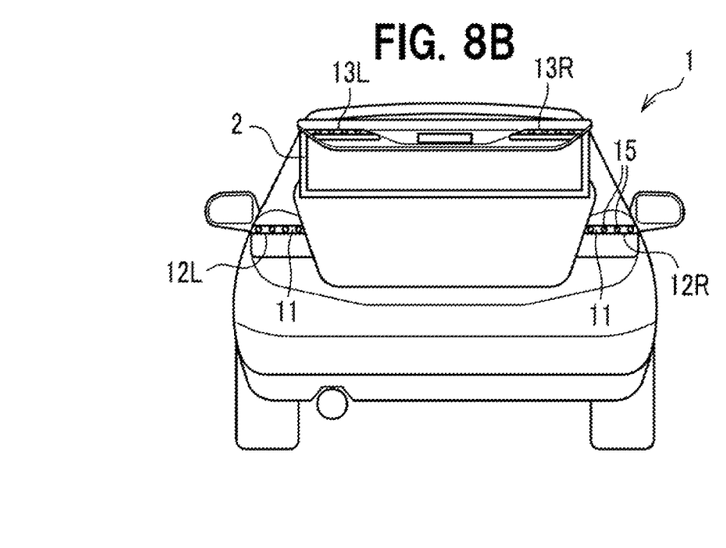
Figure 8C:
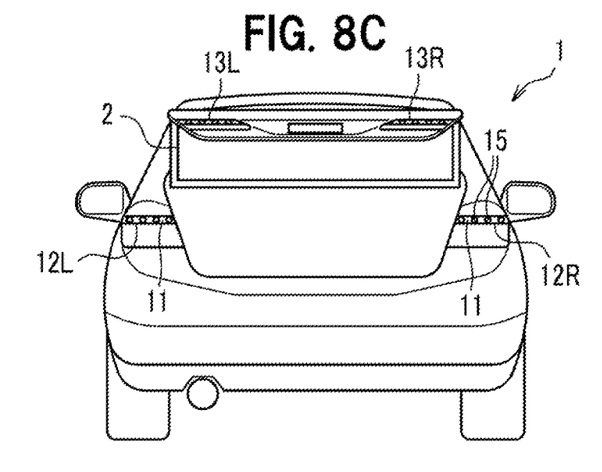
Figure 8D:
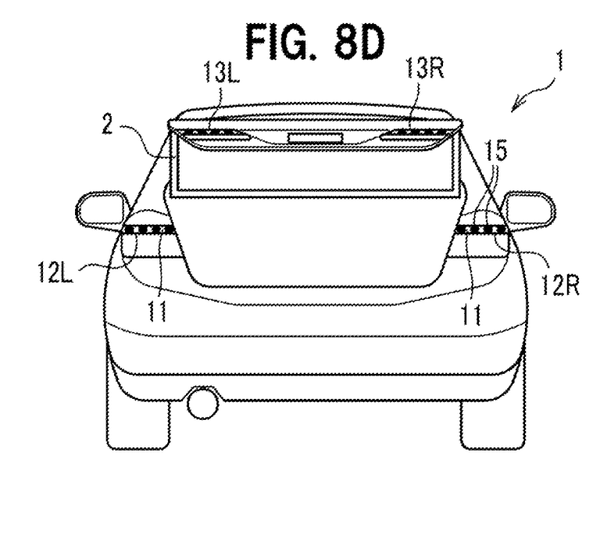

FIGS. 8A to 8D are rear views of the vehicle 1 which show, in order of FIGS. 8A and 8D, how the sequential lamps 11 are turned on and off over time in the second mode.

Because of the second mode, all the light sources 15 in each of the sequential lamps 11 are turned on although the trunk lid 2 is opened. Thus, a comparison with the cases illustrated in FIGS. 7A to 7D shows that in the cases illustrated in FIGS. 7A and 7B, the first lighting bodies 12R, 12L are turned off and the wholes of the sequential lamps 11 are hard to see from behind the vehicle. In contrast to this, in the cases illustrated in FIGS. 8A and 8B, all the first lighting bodies 12R, 12L are turned on from the beginning and the sequential lamps 11 are easy to see from behind the vehicle. Thus, when the trunk lid 2 is opened, the sequential lamps 11 are seen to be turned on for a longer time in the second mode than in the first mode.

The above-discussed embodiment performs the control as follows, even in the case where the second lighting bodies 13R, 13L in the respective sequential lamps 11 are hard to see since the trunk lid 2 is opened. Specifically, the lighting time t2 for which the first lighting bodies 12R, 12L are turned on in the first mode is longer than the lighting time t3 for which the first lighting bodies 12R, 12L are turned on in the second mode. In addition, the lighting time t2 for which the first lighting bodies 12R, 12L are turned on in the second mode is equal to the total lighting time t1 for which the first lighting bodies 12R, 12L and the second lighting bodies 13R, 13L are turned on in the first mode. The hazard lamps, therefore, give an outside person no discomfort that the lighting time for which the hazard lamps are turned on is short.

Furthermore, in the first mode, an outside person can be given a feeling that the sequential lamps 11 are turned on as if the light of the sequential lamps 11 were flowing. In addition, in the second mode, the visibility of the sequential lamps 11 can be secured since all the light sources 13 are turned on, even in the case where the trunk lid 2 is opened and no second light bodies 13R, 13L can be seen.

Moreover, the shift can be made from the first mode to the second mode while the second lighting bodies 13R, 13L or the first lighting bodies 12R, 12L are in the middle of being turned on in the first mode (FIG. 5). This makes it possible to shift from the first mode to the second mode quickly even when the trunk lid 2 is opened, and to prevent an outside person from being given a discomfort that the lighting time for which the hazard lamps are turned on is short.

Besides, in the lighting controller 23, the lighting switch 27 in the first controller 24 chooses between the first mode and the second mode, but the second controller 25 does not have to make this choice. This makes it possible to simplify the configuration of the second controller 25, and to reduce a cost of manufacturing the control device.

It should be noted that although the foregoing embodiment is configured such that the second lighting bodies 13R, 13L are turned on and thereafter the first lighting bodies 12R, 12L are turned on, a configuration may be employed such that the first lighting bodies 12R, 12L are turned on and thereafter the second lighting bodies 13R, 13L are turned on. In this case, the sequence in which the light sources 13 are turned on is arranged from the vehicle body right part 4 and the vehicle body left part 5 to the trunk lid 2.

Furthermore, the second mode may be such that only the first lighting bodies 12R, 12L are turned on while the second lighting bodies 13R, 13L are turned off.

Moreover, the first mode may be such that the second lighting bodies 13R, 13L are kept turned on at first and then are turned off in the middle of being turned on.

What is more, the first mode may be such that only a single or multiple successive light sources 13 are always turned on and the turned-on single or multiple successive light sources 13 are sequentially moved in each sequential lamp 11 in the left-right direction.

Figure 9:
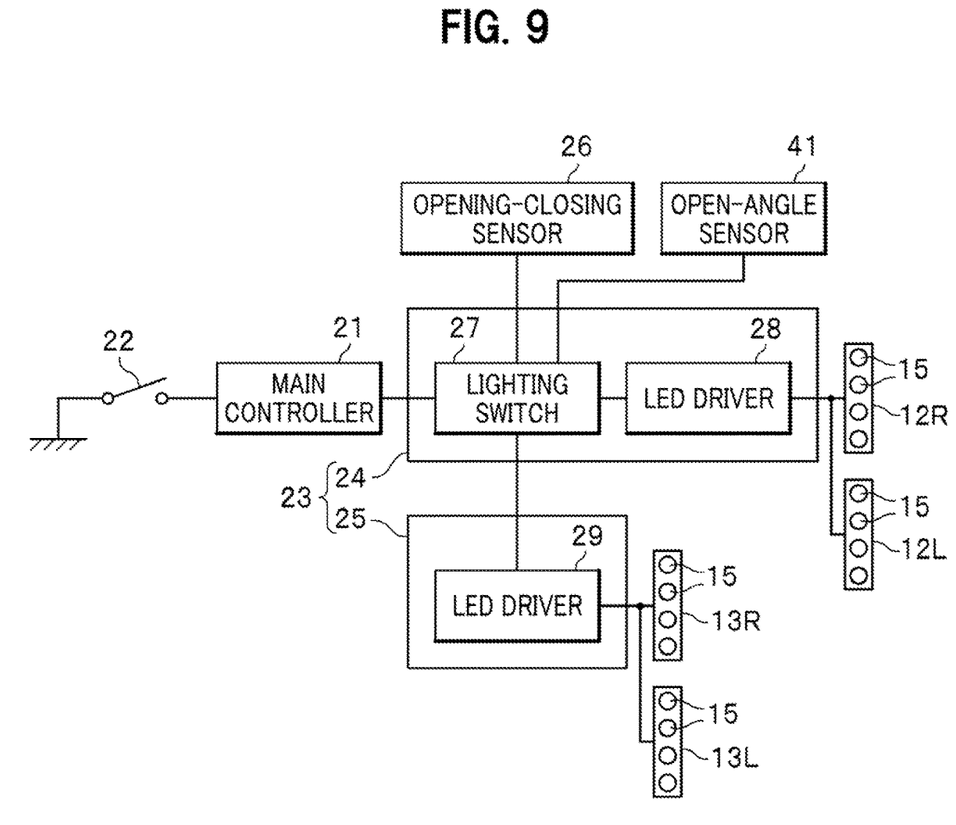
FIG. 9 is a block diagram illustrating electrical connections in a control system which controls the turning on and off of the sequential lamps in a vehicle lighting system according to a modification of the embodiment of the present invention.
Figure 10:
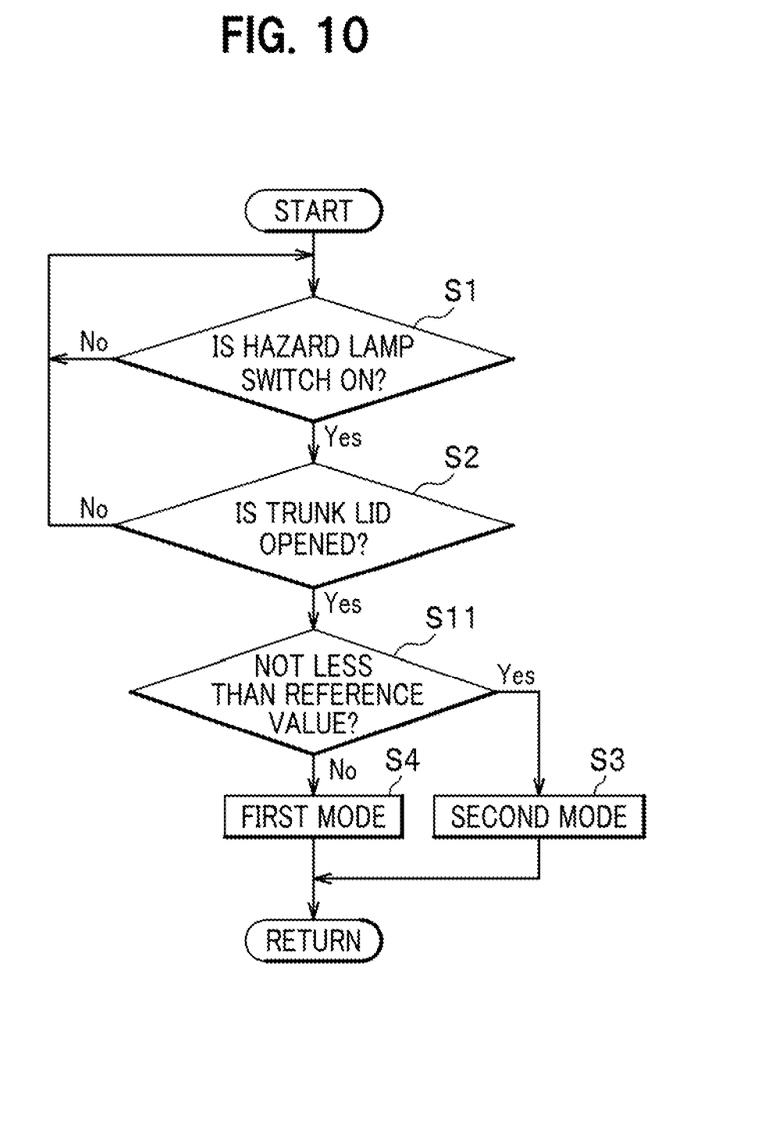
FIG. 10 is a flowchart for explaining how the control system in FIG. 9 controls the turning on and off of the sequential lamps.

Next, descriptions will be provided for a modification of the embodiment. FIG. 9 is a block diagram illustrating electrical connections in a control system according to the modification which controls the turning on and off of the sequential lamps 11. FIG. 10 is a flowchart for explaining how the control system according to the modification in FIG. 9 controls the turning on and off of the sequential lamps 11. In the modification, members and the like which are the same as those in the foregoing embodiment will be denoted by the same reference signs, and detailed descriptions for them will be omitted.

First of all, what makes the modification different from the embodiment is that the modification is provided with an open-angle sensor 41 for detecting an open angle of the trunk lid 2 (see FIG. 9), in addition to the opening-closing sensor 26. The difference further comes from the lighting switch 27 which performs control shown in FIG. 10 instead of the control shown in FIG. 3. Specifically, what makes the control in FIG. 10 different from the control in FIG. 3 is that it is determined in step S2 whether the trunk lid 2 is opened or closed, and if the trunk lid 2 is opened (if Yes in step S2), it is determines in step S11 whether the open angle of the trunk lid 2 detected by the open-angle sensor 41 is not less than a reference value. If it is determined in step S11 that the open angle of the trunk lid 2 detected by the open-angle sensor 41 is less than the reference value (if No in step S11), the first mode is set (S4). If the open angle of the trunk lid 2 detected by the open-angle sensor 41 is equal to or greater than the reference value (if Yes in step S11), the second mode is set (S3).

The reference value is set at, for example, an open angle at which the trunk lid 2 starts to make the second lighting bodies 13R, 13L invisible from behind the vehicle. This setting makes the first lighting body 12R and the second lighting body 13R closer to each other, as well as the first lighting body 12L and the second lighting body 13L closer to each other, when the open angle of the trunk lid 2 is smaller. Thus, the first lighting body 12R and the second lighting body 13R, as well as the first lighting body 12L and the second lighting body 13L can be seen at the same time from behind the vehicle 1. Accordingly, the continuation of the first mode makes it possible to enhance the design quality of the lamps. Furthermore, when the open angle of the trunk lid 2 is so large that the second lighting bodies 13R, 13L are hard to see from behind the vehicle, the discomfort felt by an outside person from the short lighting time of the hazard lamps can be eased by setting the second mode.

Although FIG. 9 shows that both the opening-closing sensor 26 and the open-angle sensor 41 are provided to the vehicle lighting system, the vehicle lighting system may be provided with only the open-angle sensor 41 and detect whether the trunk lid 2 is opened or closed based on the open angle of the trunk lid 2 detected by the open-angle sensor 41. Specifically, the open-angle sensor 41 may work as the opening-closing sensor 26 and the open-angle sensor 41 at the same time.

Furthermore, the means for detecting the open angle of the trunk lid 2 is not limited to the above sensor. For example, in a case where the trunk lid 2 is of a type which is driven by an actuator such as a motor, the open angle of the trunk lid 2 may be detected from the working of the motor or the like.

It should be noted that although the foregoing descriptions have been provided for the embodiments in which the opening-closing body according to the present invention is the trunk lid 2, the opening-closing body according to the present invention is not limited to this. For example, the opening-closing body according to the present invention may be aback door of a one-box car, a mini-van and the like. Otherwise, the opening-closing body according to the present invention may be a bonnet in a vehicle front. Other various opening-closing bodies provided to the vehicle 1 may be the opening-closing body according to the present invention.

REFERENCE SIGNS LIST

2 trunk lid (opening-closing body)
12R, 12L first lighting body
13R, 13L second lighting body
15 light source
23 lighting controller
24 first controller
25 second controller
26 opening-closing sensor
41 open-angle sensor
S3 second mode
S4 first mode

The invention claimed is:

1. A vehicle lighting system comprising:
   a first lighting body provided on an outer surface of a vehicle body;
   a second lighting body provided on an outer surface of an opening-closing body which is capable of opening and closing an opening provided to the vehicle body; and
   a lighting controller, wherein
   in a case where a condition for turning on the first lighting body and the second lighting body is satisfied,
   when the opening-closing body has been closed, the lighting controller performs a first mode of turning on the second lighting body and thereafter turning on the first lighting body, and
   when the opening-closing body has been opened, the lighting controller performs a second mode of turning on the first lighting body and keeping the first lighting body turned on for a lighting time longer than a lighting time for which the first lighting body is kept turned on in the first mode.

2. The vehicle lighting system according to claim 1, wherein
   the lighting controller makes the lighting time for which the first lighting body is kept turned on in the second mode equal to a total lighting time for which the first lighting body and the second lighting body are kept turned on in the first mode.

3. The vehicle lighting system according to claim 1, wherein
   the first lighting body includes a plurality of light sources, and
   the lighting controller
   sequentially turns on the plurality of light sources in the first mode, and
   turns on the plurality of light sources at a time in the second mode.

4. The vehicle lighting system according to claim 1, wherein when the opening-dosing body is opened while the first lighting body or the second lighting body is in a middle of being turned on in the first mode, the lighting controller shifts from the first mode to the second mode at a time of detecting the opening.

5. The vehicle lighting system according to claim 1, wherein
   the lighting controller includes
   a first controller which controls turning on of the first lighting body, and
   a second controller which controls turning on of the second lighting body,
   the first controller determines whether to set the first mode or the second mode in the first lighting body and the second lighting body, sets the first mode or the second mode in the first lighting body, and turns on the first lighting body, and
   in accordance with the determination by the first controller, the second controller sets the first mode or the second mode in the second lighting body, and turns on the second lighting body.

6. The vehicle lighting system according, to claim 1, wherein in a case where the opening-closing body has been opened,
 when an open angle of the opening-closing body is less than a pre-set reference value, the lighting controller performs the first mode, and
 when the open angle of the opening-closing body is greater than the pre-set reference value, the lighting controller performs the second mode.

7. The vehicle lighting system according to claim 2, wherein
 the first lighting body includes a plurality of light sources, and
 the lighting controller
  sequentially turns on the plurality of light sources in the first mode, and
  turns on the plurality of light sources at a time in the second mode.

8. The vehicle lighting system according to claim 2, wherein when the opening-closing body is opened while the first lighting body or the second lighting body is in a middle of being turned on in the first mode, the lighting controller shifts from the first mode to the second mode at a time of detecting the opening.

9. The vehicle lighting system according to claim 3, wherein when the opening-closing body is opened while the first lighting body or the second lighting body is in a middle of being turned on in the first mode, the lighting controller shifts from the first mode to the second mode at a time of detecting the opening.

10. The vehicle lighting system according to claim 2, wherein
 the lighting controller includes
  a first controller which controls turning on of the first lighting body, and
  a second controller which controls turning on of the second lighting body,
 the first controller determines whether to set the first mode or the second mode in the first lighting body and the second lighting body, sets the first mode or the second mode in the first lighting body, and turns on the first lighting body, and
 in accordance with the determination by the first controller, the second controller sets the first mode or the second mode in the second lighting body, and turns on the second lighting body.

11. The vehicle lighting system according to claim 3, wherein
 the lighting controller includes
  a first controller which controls turning on of the first lighting body, and
  a second controller which controls turning on of the second lighting body,
 the first controller determines whether to set the first mode or the second mode in the first lighting body and the second lighting body, sets the first mode or the second mode in the first lighting body, and turns on the first lighting body, and
 in accordance with the determination by the first controller, the second controller sets the first mode or the second mode in the second lighting body, and turns on the second lighting body.

12. The vehicle lighting system according to claim 4, wherein
 the lighting controller includes
  a first controller which controls turning on of the first lighting body, and
  a second controller which controls turning on of the second lighting body,
 the first controller determines whether to set the first mode or the second mode in the first lighting body and the second lighting body, sets the first mode or the second mode in the first lighting body, and turns on the first lighting body, and
 in accordance with the determination by the first controller, the second controller sets the first mode or the second mode in the second lighting body, and turns on the second lighting body.

13. The vehicle lighting system according to claim 2, wherein in a case where the opening-closing body has been opened,
 when an open angle of the opening-closing body is less than a pre-set reference value, the lighting controller performs the first mode, and
 when the open angle of the opening-closing body is greater than the pre-set reference value, the lighting controller performs the second mode.

14. The vehicle lighting system according to claim 3, wherein in a case where the opening-closing body has been opened,
 when an open angle of the opening-closing body is less than a pre-set reference value, the lighting controller performs the first mode, and
 when the open angle of the opening-closing body is greater than the pre-se reference value, the lighting controller performs the second mode.

15. The vehicle lighting system, according to claim 4, wherein in a case where the opening-closing body has been opened,
 when an open angle of the opening-closing body is less than a pre-set reference value, the lighting controller performs the first mode, and
 when the open angle of the opening-closing body is greater than the pre-set reference value, the lighting controller performs the second mode.

16. The vehicle lighting system according to claim 5, wherein in a case where the opening-closing body has been opened,
 when an open angle of the opening-closing body is less than a pre-set reference value, the lighting controller performs the first mode, and
 when the open angle of the opening-closing body is greater than the pre-set reference value, the lighting controller performs the second mode.

\* \* \* \* \*